United States Patent Office 2,897,792
Patented Aug. 4, 1959

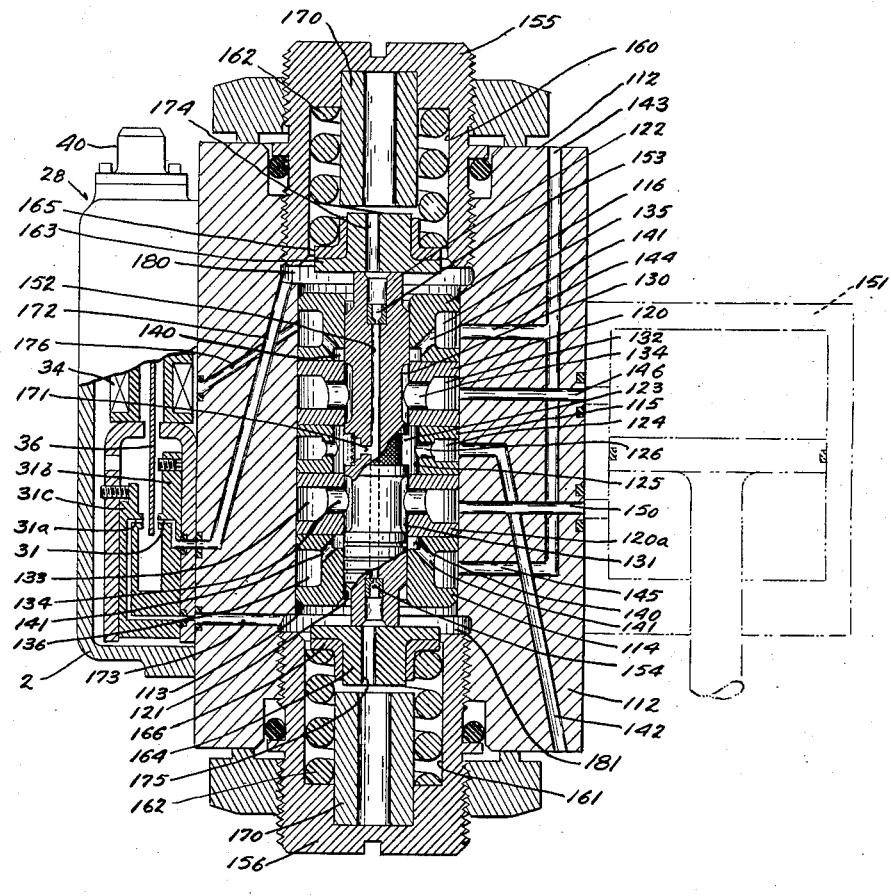

2,897,792

SERVO VALVES

George T. Baltus and Martin P. Wolpin, Tonawanda, Bert Smith, Jr., Williamsville, and Joseph S. Lachcik, Buffalo, N.Y., assignors, by mesne assignments, to Hydraulic Research & Manufacturing Co., Burbank, Calif., a corporation of California Application March 5, 1954, Serial No. 414,488

1 Claim. (Cl. 121—46.5)

Our invention relates in general to servo mechanisms and in particular to an electro-hydraulic servo valve.

Prior valves of this type usually have the power stage consisting of a single spool slidably mounted in a bore made up of a number of rings shrunk into the body. To meet the overlap requirements in constructions of this type, i.e., the amount of closure at each of the four flow control points in their neutral positions, a total of three dimensions on the spool and three dimensions on the assembling ring must be held to very close tolerances. The only practical way to provide the overlap under these conditions within the tolerance range allowed, is by a procedure consisting of the manufacture of the parts, initial inspection, reworking and an additional inspection. Furthermore, in valves of present design the filter screen is usually located at points where the flow is only toward the orifice, resulting in particles of dirt being retained on the screen in the absence of forces other than that due to the pressure drawn across the screen and consequently such valves are always subject to failure due to accumulation of particles which result in cutting off the flow of oil.

An object of this invention is to construct a valve of this type in which the overlap may be provided without requiring any rework operations.

An object of this invention is to provide a valve having orifices which are so located as to simplify the porting provisions and enable the volume of oil entrapped between the orifice and the nozzle tip to be kept to a minimum, thus permitting high dynamic performance.

A further object is to place the inlet screen at the entrance to the control system and to so locate it as to be in the region of high flow, whereby a self-cleaning action is obtained wherein particles retained by the screen can be swept away by the flow of fluid through the power stage.

A further object is to provide a device of this nature in which the flapper valve has a minimum number of parts which are readily adapted to high production fabrication processes, and one which has a minimum number of parts that require close tolerence.

A further object is to provide a device in which the nozzles are mounted within the frame of the magnetic motor, all the parts being completely within the oil path thereby greatly reducing the detrimental effects upon performance due to differential expansion and thermo shock.

Moreover, our valve is provided with nozzle tips made from drawn tubing which permits accurate matching of pairs of nozzles and which permits the annular flat surface thereof to be automatically maintained within acceptable limits. Such construction also permits the nozzles to be made of relatively hard and wear-resisting materials.

Moreover, our device is provided with magnetic filters which are highly effective in trapping magnetic particles in the oil and preventing their reaching the nozzles.

The above objects and advantages have been accomplished by the device shown in the accompanying drawings, of which:

The figure is a longitudinal sectional view of a preferred form of the invention showing the passageways in schematic manner.

In the form of invention shown in the drawing, the casing 112 is made in one piece and is formed with a longitudinal cylindrical recess 113 in which is disposed a sleeve made up of a number of sleeve members and comprising an inlet sleeve member 115, two exhaust sleeve members 116 and 114, and two actuator sleeve members 120 and 120a. These sleeve members are held in alignment by means of the bore 113 of the casing, and a longitudinal bore 121 is formed in them for the slidable support of a one-piece spool 122. The spool is provided substantially midway its length with a pressure cavity 123 of a length slightly less than the length of the inlet sleeve member 115, whereby flow of fluid from the main supply will be cut off when the spool is in its neutral position. The sleeve member 115 is formed with a peripheral groove forming a supply recess 124 and with a counterbore 125 which are in communication with each other by means of a plurality of radial ports 126 formed therein.

Flow cavities 130 and 131 are formed in the spool and disposed on each side of the pressure cavity 123 and in registration respectively, with the actuator sleeve members 120 and 120a. These sleeve members are formed, respectively, with peripheral grooves 132 and 133 which are in communication with the cavities 130 and 131, respectively, through radial ports 134. The exhaust sleeve members 116 and 114 are formed with annular grooves 135 and 136, respectively, and a counterbore 140 is formed in the surface which is adjacent the actuator sleeve sections 120 and 120a. Each of the counterbores is connected with one of the grooves 135 and 136 by means of a plurality of angularly disposed ports 141.

The casing 112 is formed with a supply passageway 142 which is connected with a supply tank (not shown) and which is in communication with the inlet sleeve member 115. An exhaust passageway 143 is also formed in the casing for returning fluid to the supply tank. This exhaust passageway has two branches 144 and 145, each of which communicates with one of the exhaust sleeve members 116 and 114, respectively. Actuator passageways 146 and 150 are also formed in the casing, and these passageways serve to connect the actuator sleeve members 120 and 120a, respectively, with the inlet and the outlet of the actuator 151.

In this form of the invention, the spool is formed with a longitudinal passageway 152 which extends throughout the length of the spool and which is formed with an orifice 153 at one end thereof and with an orifice 154 at the other end. Adjustors 155 and 156 are screw-threaded, one in each end of the casing and serve to close the ends of the casing recess 113. The adjustors are formed with centrally arranged pressure recesses 160 and 161, respectively, in each of which is disposed a non-metallic helical spring 162 which acts upon the adjacent ends of the spool through the medium of non-metallic spring supports 163 and 164, respectively, carried by steel sleeves 165 and 166 respectively. A permanent magnet 170 is carried by each adjustor and provides magnetic gaps between the inner ends thereof and the steel sleeves 165 and 166, and between the steel sleeves and the inner edges of the adjustors.

The passageway 152 of the spool is connected to the pressure cavity 123 thereof by means of a lateral passageway 171 whereby fluid is permitted to pass through the orifices 153 and 154 to the respective nozzles of the flapper valve assembly 28 which is enclosed within a cap 2. This assembly carries an electrical connector within a shell 40 and has nozzle arms 31c and 31b provided with nozzle tips 31a and 31 respectively. A flapper valve 36 is shown in its neutral position. The nozzle tip 31 is connected to the end of the spool, having the orifice 153, by means of a passageway 172 formed in the casing 112, and a passageway 173 also formed in the casing serves to connect the orifice 154 at the opposite end of the spool with the nozzle tip 31a. Apertures 174 and 175 are formed, respectively, in each of the spring supports 163 and 164 whereby fluid from the orifice of the spool is communicated to the pressure chambers 180 and 181 of the adjustors and thence, respectively through the passageways 172 and 173 of the casing leading to the associated nozzle tips of the flapper valve assembly. A return passageway 176 is formed in the casing and serves to connect the casing 2 of the flapper valve assembly with the main return passageway 143 through the angular groove 135 of the exhaust sleeve member 116 and branch passageway 144.

As shown in this figure, leakage of fluid through the nozzle tips will be substantially equal, and the spool will be maintained by the preloaded springs 162 in neutral positions. When, however, the flapper valve is drawn by electromagnet 34 toward, for instance, the nozzle tip 31, leakage of fluid through this nozzle will be restricted and consequently pressure will be built up in the pressure recess 160 which will cause the spool 122 to move downwardly thus opening the counterbore 125 of the inlet sleeve member 115 to the spool cavity 130, radial passageways 134 of the exhaust sleeve member 120, actuator passageway 146 to the upper end of the cylinder of the actuator 151. With the spool in this position, the counterbore 140 of the exhaust sleeve member 114 will be uncovered, and fluid from the lower side of the actuator piston will be expelled through actuator passageway 150, annular groove 133, and lateral passageways 134 of the exhaust sleeve member 120a through spool cavity 131, counterbore 140 and angular ports 141 into the annular groove 136 of the exhaust sleeve member 114, and thence through branch passageway 145 of the exhaust passageway 143 and thereby return to the supply tank.

When the flapper valve is actuated to close the nozzle jet 31a, pressure will be built up in the pressure recess 161 thereby moving the spool upwardly, the fluid will then flow from the supply passage 142 to the lower end of the cylinder of the actuator 151 through groove 124 and lateral ports 126 to the counterbore 125, spool cavity 131, lateral ports 134, annular groove 133 and to the lower side of the piston through the actuator port 150, causing the actuator piston to be moved upwardly. The fluid on the opposite side of the piston will be returned to the supply tank, not shown, through the actuator passageway 146, the annular groove 132 and lateral ports 134, spool cavity 130, counterbore 140, angular ports 141 of the exhaust sleeve member 116, and branch passageway 144 to the exhaust passageway 143. Fluid leakage through the nozzle tips will be conducted from the casing 2 of the flapper valve assembly through the return passageway 176, the annular groove 135 of the exhaust sleeve member 116 and thence through the exhaust passage 143 through branch passage 145.

What is claimed is:

A servo valve of the character described comprising a casing having an input fluid supply passageway and fluid exhaust passageway means, separate power output fluid passageways for connection to a hydraulic actuator, the casing being formed with a cylindrical recess, a plurality of sleeve members mounted within the recess, said plurality of members comprising a centrally disposed inlet sleeve member and an actuator sleeve member disposed at each side of said inlet sleeve member and an exhaust sleeve member disposed at the outer end of each of said actuator members, the sleeve members being formed with registering cylindrical bores, the inlet sleeve member being formed with a peripheral groove and an enlarged central bore connected by radial ports, the annular groove of the inlet sleeve member being in communication with the input fluid supply passageway, each of the actuator sleeve members being formed with a peripheral groove and a plurality of radial ports connecting the groove with the bore of the actuator member, the grooves of said actuator sleeve member being in communication with different ones of the power output fluid passageways of the actuator, each of the exhaust sleeve members being formed with a peripheral groove in communication with said exhaust passageway means and formed with a counterbore, radial ports connecting said counterbores and the grooves of said members, a spool valve slidably mounted in the sleeve members and formed with an inlet cavity in the region of said inlet sleeve member, said spool means being formed with surface cavities in the region of said actuator sleeve members, said spool means being formed with an axial passageway extending throughout its length and formed with a restricted orifice at each end thereof terminating at each end in a pressure chamber, said spool means having a lateral passageway extending from said axial passageway and opening into the input fluid groove of the spool means, resilient means tending to maintain said spool means in neutral position in said sleeve members, and control means for causing axial displacement of said spool valve in either direction, whereby upon displacement of said spool valve fluid will flow from said fluid supply input to one of said output fluid passageways to cause the actuator to operate.

References Cited in the file of this patent

UNITED STATES PATENTS

| 763,694 | Robinson | June 28, 1904 |
| 1,016,167 | McCulloch | Jan. 30, 1912 |
| 1,355,426 | Popp | Oct. 12, 1920 |
| 2,478,290 | Linder | Aug. 9, 1949 |
| 2,500,407 | Segerstad | Mar. 14, 1950 |
| 2,625,136 | Moog | Jan. 13, 1953 |
| 2,641,279 | Baldwin | June 9, 1953 |
| 2,655,940 | Jackson | Oct. 20, 1953 |
| 2,675,652 | Chiappulini | Apr. 20, 1954 |
| 2,767,689 | Moog | Oct. 23, 1956 |
| 2,775,254 | Stanbury | Dec. 25, 1956 |